US008983431B2

(12) United States Patent
Lee et al.

(10) Patent No.: US 8,983,431 B2
(45) Date of Patent: Mar. 17, 2015

(54) METHOD OF RECEIVING PLMN INFORMATION AT A TERMINAL IN A WIRELESS COMMUNICATION, AND APPARATUS FOR SAME

(75) Inventors: Youngdae Lee, Anyang-si (KR); Sunghoon Jung, Anyang-si (KR); Seungjune Yi, Anyang-si (KR); Sungduck Chun, Anyang-si (KR); Sungjun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 106 days.

(21) Appl. No.: 13/877,853

(22) PCT Filed: Nov. 7, 2011

(86) PCT No.: PCT/KR2011/008403
§ 371 (c)(1),
(2), (4) Date: Apr. 4, 2013

(87) PCT Pub. No.: WO2012/060668
PCT Pub. Date: May 10, 2012

(65) Prior Publication Data
US 2013/0189978 A1 Jul. 25, 2013

Related U.S. Application Data

(60) Provisional application No. 61/410,853, filed on Nov. 5, 2010.

(51) Int. Cl.
*H04M 1/66* (2006.01)
*H04W 4/00* (2009.01)
*H04W 72/00* (2009.01)
*H04M 1/00* (2006.01)
*H04B 7/00* (2006.01)
*H04W 48/16* (2009.01)
*H04W 48/02* (2009.01)

(52) U.S. Cl.
CPC .............. *H04W 48/16* (2013.01); *H04W 48/02* (2013.01)
USPC ........... 455/410; 455/411; 455/434; 455/450; 455/509; 455/552.1

(58) Field of Classification Search
CPC .......... H04L 63/0853; H04L 63/0272; H04W 12/06; H04W 48/02; H04W 48/16; H04W 1/66; H04W 4/00; H04W 72/00; H04M 1/00; H04B 7/00
USPC ......... 455/410–411, 433–434, 436, 438–439, 455/450, 509, 552.1; 370/352
See application file for complete search history.

(56) References Cited

U.S. PATENT DOCUMENTS

| | | | |
|---|---|---|---|
| 2004/0058679 A1* | 3/2004 | Dillinger et al. | 455/439 |
| 2006/0223498 A1* | 10/2006 | Gallagher et al. | 455/410 |
| 2008/0132239 A1* | 6/2008 | Khetawat et al. | 455/438 |
| 2008/0200146 A1* | 8/2008 | Wang et al. | 455/410 |
| 2010/0105380 A1* | 4/2010 | Attar et al. | 455/434 |
| 2010/0304782 A1* | 12/2010 | Chang et al. | 455/552.1 |
| 2012/0142388 A1* | 6/2012 | Kumar et al. | 455/509 |

* cited by examiner

*Primary Examiner* — Inder Mehra
(74) *Attorney, Agent, or Firm* — Birch, Stewart, Kolasch & Birch, LLP

(57) ABSTRACT

Disclosed is a method of receiving PLMN (Public Land Mobile Network) information at a terminal in a wireless communication. In particular, the method of the present invention comprises the steps of receiving system information including a PLMN list and a prohibition indicator for limiting access to at least one PLMN of the PLMN list and performing access limitation to the specific network during a specific time.

14 Claims, 10 Drawing Sheets

FIG. 3
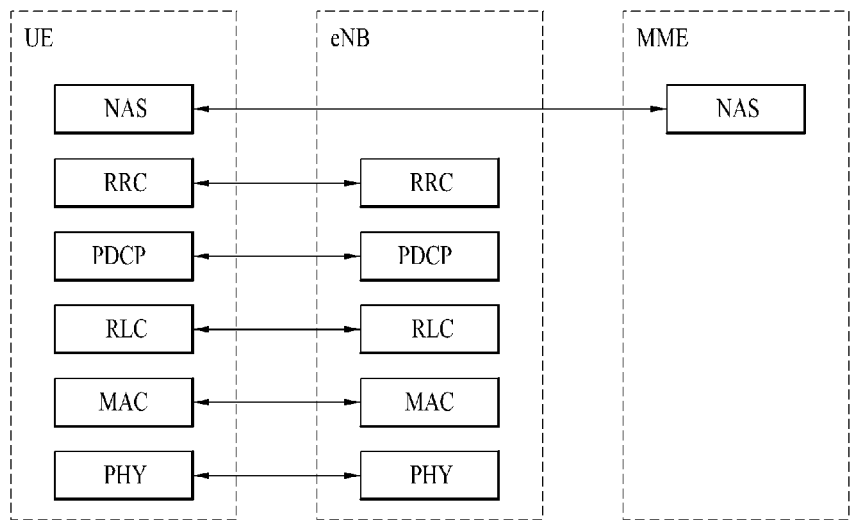
(a) Control plane protocol stack
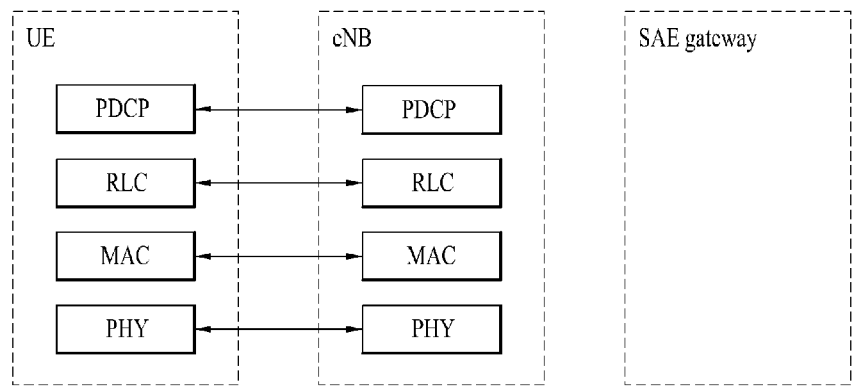
(b) User plane protocol stack

METHOD OF RECEIVING PLMN INFORMATION AT A TERMINAL IN A WIRELESS COMMUNICATION, AND APPARATUS FOR SAME

CROSS REFERENCE TO RELATED APPLICATIONS

This application is the National Phase of PCT/KR2011/008403 filed on Nov. 7, 2011, which claims priority under 35 U.S.C. 119(e) to U.S. Provisional Application No. 61/410,853 filed on Nov. 5, 2010, all of which are hereby expressly incorporated by reference into the present application.

TECHNICAL FIELD

The present invention relates to wireless communication system, and more particularly, to a method of selecting a PLMN (Public Land Mobile Network), which is selected by a latency tolerance supportive of user equipment in a wireless communication system and apparatus therefor.

BACKGROUND ART

3GPP LTE ($3^{rd}$ generation partnership project long term evolution) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "$3^{rd}$ generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Tasks

Based on the aforementioned discussion, the present invention intends to propose a method of selecting a PLMN, which is selected by a latency tolerance supportive of user equipment in a wireless communication system and apparatus therefor in the following description. More specifically, the latency tolerance supportive of user equipment receives one PLMN list or a plurality of PLMN lists and access prohibition information on a single PLMN or a plurality of PLMNs from a system block. In case that the access prohibition information indicates an access restriction on the single PLMN or a plurality of the PLMNs, an object of the present invention is to provide an machine to machine (M2M) communication scheme making the user equipment perform the access restriction on the PLMN for a specific time duration.

Technical Solution

A method of receiving a PLMN (Public Land Mobile Network) information, which is received by a user equipment in a wireless communication system includes the steps of receiving a PLMN list and a prohibition indicator limiting an access of at least one PLMN included in the PLMN list from a network via a system information and if the prohibition indicator indicates an access prohibition for a specific PLMN, limiting an access to the network for the specific PLMN for a specific time.

In this case, the access to the network limiting step includes the step of performing a PLMN selection process excluding the specific PLMN.

Preferably, if the specific PLMN corresponds to a HPLMN (Home PLMN), the access to the network limiting step includes the step of performing a PLMN selection process without excluding the specific PLMN. In this case, the PLMN selection process corresponds to a PLMN re-selection process.

In particular, the prohibition indicator is reported to a NAS (Non-Access Stratum) layer by an RRC (Radio Resource Control) layer. In this case, the RRC layer reports the specific PLMN to the NAS layer together with the prohibition indicator.

The specific time may correspond to a change cycle or a repetition cycle of the system information. Or, the specific time may correspond to a fixed value or a value transmitted from the network. In particular, the system information corresponds to a system information block type 1.

Meanwhile, according to a different embodiment of the present invention a user equipment device in a wireless communication system includes a receiving module configured to receive a PLMN list and a prohibition indicator limiting an access of at least one PLMN included in the PLMN list from a network via a system information and if the prohibition indicator indicates an access prohibition for a specific PLMN, a processor configured to limit an access to the network for the specific PLMN for a specific time.

Advantageous Effects

According to embodiments of the present invention, a latency tolerance supportive of user equipment may be able to efficiently control a PLMN selection in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 3 is a diagram for structures of control and user planes of radio interface protocol between a 3GPP radio access network standard-based user equipment and E-UTRAN;

BEST MODE

Mode for Invention

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

Figure 1:
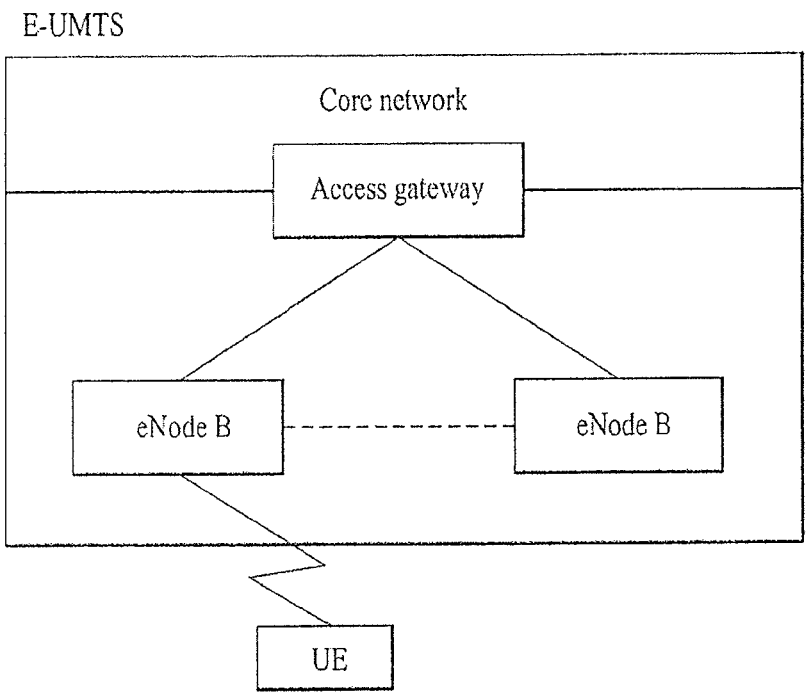
FIG. 1 is a schematic diagram of E-UMTS network structure as one example of a wireless communication system.
Figure 2:
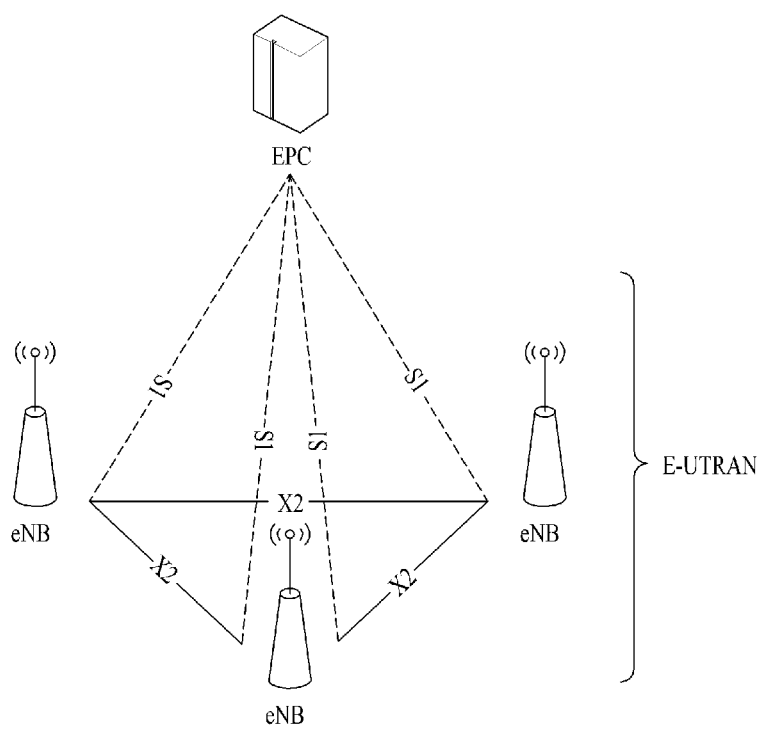
FIG. 2 is a conceptual diagram of E-UTRAN (evolved universal terrestrial radio access network) network structure.

FIG. 2 is a conceptual diagram of E-UTRAN (evolved universal terrestrial radio access network) network structure. In particular, the E-UTRAN system is a system evolved from a conventional UTRAN system. The E-UTRAN consists of cells (eNBs) and the cells are connected to each other via X2 interface. A cell is connected to a user equipment via a radio interface and is connected to EPC (evolved packet core) through S1 interface.

The EPC includes MME (mobility management entity), S-GW (serving-gateway) and PDN-GW (packet data network-gateway). The MME has an access information of a user equipment or information on a capability of a user equipment. This information is mainly used for a mobility management of user equipment. The S-GW is a gateway having E-UTRAN as an end point. The PDN-GW is a gateway having PDN (packet data network) as an end point.

FIG. 3 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a $1^{st}$ layer, provides higher layers with an information transfer service using a physical channel. The physical layer is connected to a medium access control layer situated above via a transport channel. Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a $2^{nd}$ layer provides a service to a radio link control (hereinafter abbreviated RLC) layer, which is a higher layer, on a logical channel. The RLC layer of the $2^{nd}$ layer supports a reliable data transmission. The function of the RLC layer may be implemented by a function block within the MAC. PDCP (packet data convergence protocol) layer of the $2^{nd}$ layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a $3^{rd}$ layer is defined on a control plane only. The RRC layer is responsible for control of logical channels, transport channels and physical channels in association with a configuration, a re-configuration and a release of radio bearers (hereinafter abbreviated RBs). The RB indicates a service provided by the $2^{nd}$ layer for a data delivery between the user equipment and the network. To this end, the RRC layer of the user equipment and the RRC layer of the network exchange a RRC message with each other.

In the following description, an RRC state of a user equipment and an RRC connecting method are explained. First of all, the RRC state may indicate whether the RRC of the user equipment is logically connected to the RRC of the E-UTRAN. If the RRCs are logically connected together, such a state can be named 'RRC_CONNECTED state'. Otherwise, such a state can be named 'RRC_IDLE state'.

Since E-UTRAN is able to recognize an existence of user equipment in the RRC_CONNECTED state by cell unit, the E-UTRAN is able to effectively control the corresponding user equipment. On the other hand, the E-UTRAN is unable to recognize the user equipment in the RRC_IDLE state by the cell unit. Hence, core network (CN) may manage the user equipment in the RRC_IDLE state by tracking area (TA) unit, which is a unit of area larger than a cell. Therefore, in order for the user equipment in RRC IDLE state to receive such a service as a voice service, a data service from the cell, the corresponding user equipment should make a transition to an RRC_CONNECTED state.

When a user initially turns on a power of a user equipment, the user equipment searches for an appropriate cell and then stays in RRC_IDLE state in the found cell. If the user equipment staying in the RRC_IDLE state needs to establish an RRC connection, the user equipment establishes the RRC connection with an RRC of E-UTRAN and then makes a transition to RRC_CONNECTED state. In this case, a case of establishing an RRC connection may include a case that an uplink data transmission is required due to such a reason as a user's call attempt and the like, a case that a response message needs to be sent in response to a reception of a paging message from the E-UTRAN, and the like.

Meanwhile, an NAS (Non-access stratum) layer situated at the above of an RRC layer performs such a function as a session management and a mobility management and the like. In the NAS layer, two states, which correspond to an EMM (EPS mobility management) registered state (EMM-REGISTERED) and an EMM unregistered state (EMM-UNREGISTERED) are defined for a mobility management of a user equipment. These two states are applied to the user equipment and MME. An initial UE corresponds to the state of the EMM unregistered. The user equipment performs a process of registering to a corresponding network to access the network via an initial attach procedure. If the attach procedure is successfully performed, the user equipment and the MME become the state of EMM registered.

In particular, in the NAS layer, two states, which correspond to an ECM (EPS connection management) idle state (ECM_IDLE) and an ECM connected state (ECM_CONNECTED), are defined to manage a signaling connection between a user equipment and an EPC. These two states are applied to the user equipment and MME. If a user equipment in the state of ECM idle establishes an RRC connection with E-UTRAN, the corresponding user equipment becomes the user equipment in the state of ECM connected. If the MME in the state of ECM idle establishes an S1 connection with E-UTRAN, the MME becomes the MME in the state of ECM connected.

When a user equipment is in a state of ECM idle, E-UTRAN does not have information (context) on the user equipment. Hence, the user equipment in the state of ECM idle performs such a UE-based mobility related procedure as a cell selection, a cell re-selection, or the like without receiving a network command. On the contrary, when a user equipment is in a state of ECM connected, mobility of the user equipment is managed by the network command. If a position of a user equipment in a state of ECM idle changes from the position of which the network is aware, the corresponding position of the user equipment is informed to the network via a TA (tracking area) update process by the user equipment.

A single cell consisting of an eNode B is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel).

Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 4:
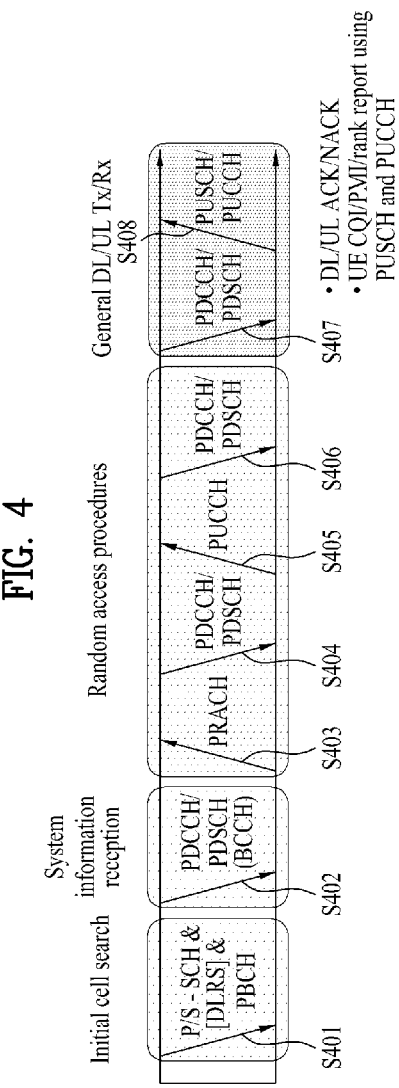
FIG. 4 is a diagram for explaining physical channels used for 3GPP system and a general signal transmission method using the physical channels.

FIG. 4 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S401]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S402].

Meanwhile, if a user equipment initially accesses an eNode B or does not have a radio resource for transmitting a signal, the user equipment may be able to perform a random access procedure to complete the access to the base station [S403 to S406]. To this end, the user equipment may transmit a specific sequence as a preamble on a physical random access channel (PRACH) [S403] and may be then able to receive a response message on PDCCH and the corresponding PDSCH in response to the preamble [S404]. In case of a contention based random access procedure (RACH), it may be able to additionally perform a contention resolution procedure.

Having performed the above mentioned procedures, the user equipment may be able to perform a PDCCH/PDSCH reception [S407] and a PUSCH/PUCCH (physical uplink shared channel/physical uplink control channel) transmission [S408] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 5:
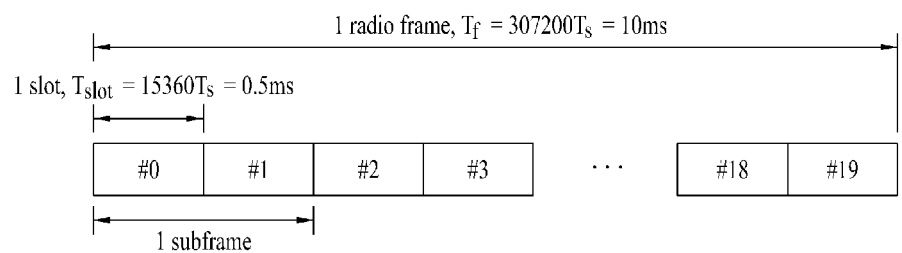
FIG. 5 is a diagram for a structure of a radio frame in LTE system.

FIG. 5 is a diagram for a structure of a radio frame used in an LTE system.

Referring to FIG. 5, one radio frame has a length of 10 ms ($327,200 \times T_s$) and is constructed with 10 subframes in equal size. Each of the subframes has a length of 1 ms and is constructed with two slots. Each of the slots has a length of 0.5 ms ($15,360 \times Ts$). In this case, $T_s$ indicates a sampling time and is represented as $T_s=1/(15 \text{ kHz} \times 2048)=3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 6:
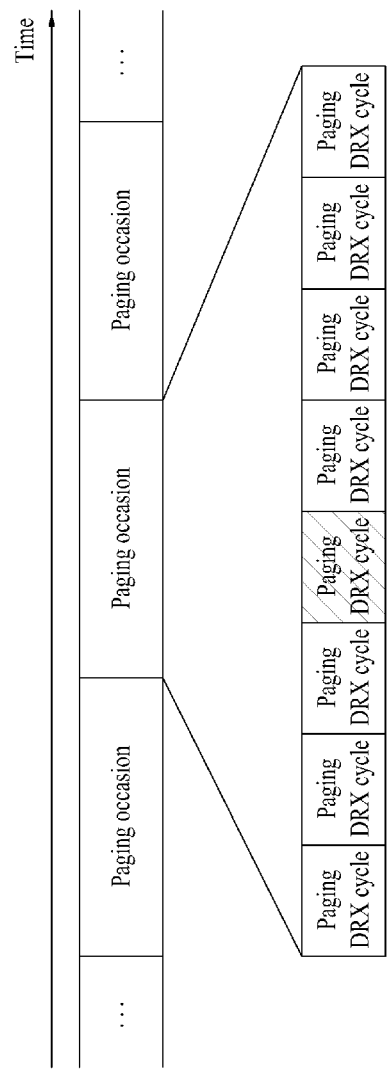
FIG. 6 is a diagram for explaining a general transceiving method using a paging message.

FIG. 6 is a diagram for explaining a general transceiving method using a paging message.

Referring to FIG. 6, a paging message includes a paging record consisting of a paging cause, a user equipment identity and the like. When the paging message is received, a user equipment may be able to perform a discontinuous reception (DRX) cycle for the purpose of power consumption reduction.

Specifically, a network may configure a plurality of paging occasions (PO) on every time cycle, which is called a paging cycle (paging DRX cycle). And, the network enables a specific user equipment to obtain a paging message by receiving a specific paging occasion only. The user equipment does not receive any paging channel except the corresponding specific paging occasion and may stay in an idle state to reduce power consumption. One paging occasion corresponds to one TTI (transmission time interval).

An eNode B and a user equipment use a paging indicator (hereinafter abbreviated PI) as a specific value for indicating a transmission of a paging message. The eNode B may define a specific identifier (e.g., paging-radio network temporary identity (P-RNTI)) with the purpose of PI usage and then may be able to inform the user equipment of a transmission of a paging information. For instance, the user equipment wakes up on every DRX cycle and then receives one subframe to know whether a paging message has appeared. If the P-RNTI exists on a L1/L2 control channel (PDCCH) of the received subframe, the user equipment may be able to know that a paging message exists on a PDSCH of the corresponding subframe. And, if the paging message includes a user equipment identifier (e.g., IMSI) of the user equipment, the user equipment may be able to receive a service in response to the eNode B (e.g., RRC connection or system information reception).

In the following description, system information is explained. First of all, the system information may include essential information a user equipment should know to access a network. Therefore, the user equipment should receive all system informations before accessing an eNode B and have latest system information all the time. Since system information is the information all user equipments in a cell should be aware of, the eNode B broadcasts the system information periodically.

System information may be divided into a master information block (MIB), a scheduling block (SB) and a system information block (SIB). The MIB enables a user equipment to know a physical configuration, e.g., bandwidth of a corresponding cell. Transmission information (e.g., transmission periods, etc.) of the SIBs are indicated by the SB. The SIB is a set of system informations related to each other. For instance, a specific SIB contains information on a neighbor cell only and a different SIB contains information on an uplink radio channel used by the user equipment only.

In order to inform the user equipment of whether the system information is modified, the e Node B sends a paging message. In this case, the paging message includes a system information change indicator. The user equipment receives the paging message according to a paging cycle. If the paging message includes the system information change indicator, the user equipment receives the system information transmitted via the BCCH, which is a logical channel.

In the following description, MTC (machine type communication) is explained.

The MTC may generally mean a communication established between a machine and another machine without human involvement. A user equipment used for the MTC is an MTC device. The MTC can be called an M2M (machine to machine). A service provided by the MTC has difference from the service provided by the communication, which is involved by human being. The service provided by the MTC includes the services of various scopes as follows. For instance, the MTC provides such a service as tracking, metering, payment system, health care service, remote controlling, and the like.

Figure 7:
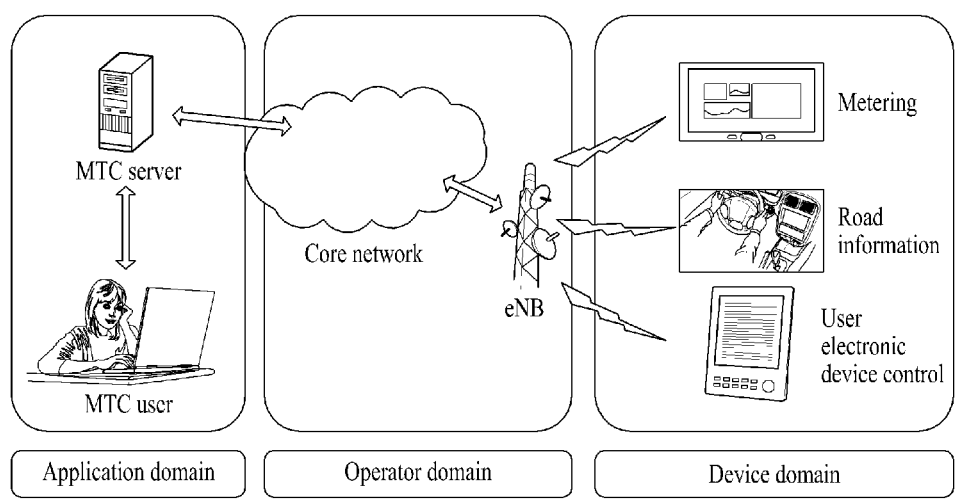
FIG. 7 is a diagram for explaining a structure of an MTC (machine type communication)

FIG. 7 is a diagram for explaining a structure of an MTC (machine type communication).

An MTC device performs a communication with a different MTC device or an MTC server via a mobile communication network. Referring to FIG. 7, the MTC server may be able to provide such a service provided by the MTC device as metering, road information, user electronic device control, and the like to an MTC user.

In order to efficiently support the MTC service, such characteristics of the MTC device as a low mobility of the MTC device, time tolerant (or delay tolerant), latency tolerance, small data transmission, and the like may be considered. For this sort of reason, the MTC device can be called a delay tolerant access supportive of user equipment.

In particular, it may assume that a plurality of MTC devices may exist in a single cell. Hence, in case that a communication service is simultaneously provided to a plurality of the MTC devices, all of the MTC devices should establish an RRC connection with a network. According to a legacy technology, since all of the MTC devices are trying to establish the RRC connection at the same time, an overload occurs in a mobile communication network corresponding to a specific PLMN (public land mobile network) and then a problem that a correct service is not provided to the devices occurs. In this case, the PLMN indicates a network identification number of a mobile communication network service provider. In this case, an eNode B broadcasts such an access restricting information as an ACB (access class barring) and may be then able to prevent the MTC devices from accessing the eNode B.

Yet, according to the legacy technology, in case that two or more mobile communication networks are used in a manner of sharing one eNB, due to an overload occurred in a mobile communication network corresponding to a first PLMN, a problem that an accessing a mobile communication network corresponding to a second PLMN is limited as well occurs. For instance, in case that an eNB supports the mobile communication network corresponding to the first PLMN and the mobile communication network corresponding to the second PLMN, if an overload occurs only at the mobile communication network corresponding to the first PLMN, an MTC device registered to the mobile communication network corresponding to the second PLMN may be restricted to access a corresponding eNB due to the overload of the mobile communication network corresponding to the first PLMN.

Hence, in order to solve the problem of the legacy technology, the present invention proposes that an MTC user equipment receives one PLMN list or a plurality of PLMN lists and access prohibition information (i.e., prohibition indicator) on a mobile communication network corresponding to a single PLMN or a plurality of PLMNs from a system block. If the access prohibition information indicates an access restriction on the mobile communication network corresponding to the single PLMN or a plurality of the PLMNs, the present invention proposes that the MTC user equipment performs the access restriction on the single PLMN or a plurality of the PLMNs for a specific time duration.

More specifically, RRC layer of the user equipment receives a PLMN list together with the access prohibition information from the system information block. The RRC layer of the user equipment receives a single access prohibition information for all PLMNs included in the PLMN list or receives a single access prohibition information for each of the PLMNs included in the PLMN list. In this case, the RRC layer of the user equipment delivers the access prohibition information to NAS layer of the user equipment.

Preferably, the specific time limiting access to a mobile communication network corresponding to a PLMN may correspond to a change cycle or a repeat cycle of system information. And, the specific time may correspond to a changeable time value indicated by a wireless network or a fixed time value identically applicable to all user equipments. Moreover, the PLMN list may be a whole or a part of the PLMN list included in a system information block type 1.

In the following description, a detail example is described with reference to diagrams.

Figure 8:
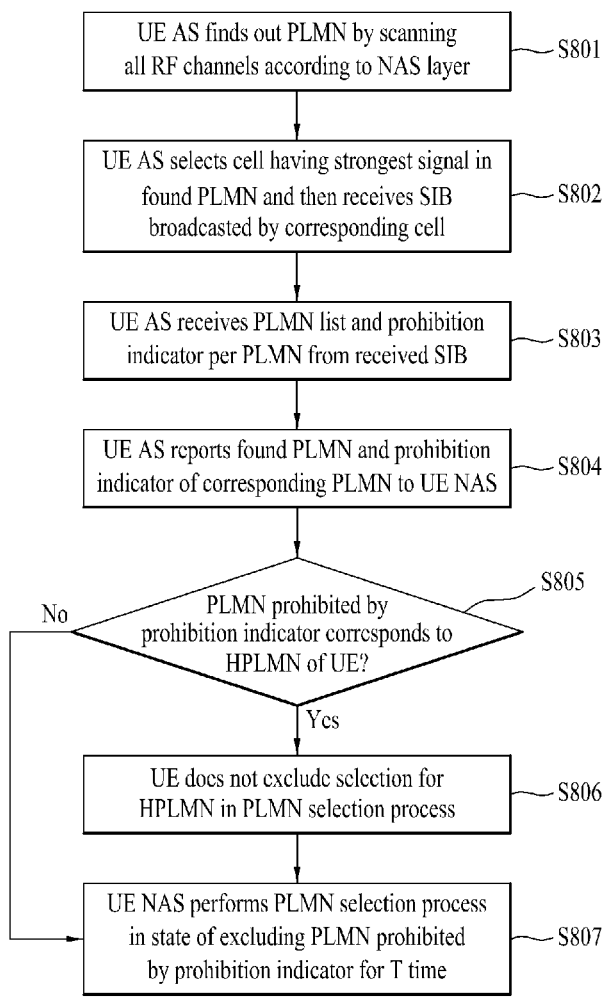
FIG. 8 is a flowchart for describing a method of selecting a PLMN of an MTC user equipment according to embodiment of the present invention.

FIG. 8 is a flowchart for describing a method of selecting a PLMN of an MTC user equipment according to embodiment of the present invention. In particular, FIG. 8 shows a process of selecting a PLMN for a user equipment in a state of idle to access a mobile communication network.

Referring to FIG. 8, first of all, in order to find out PLMNs corresponding to an accessible mobile communication network, an AS (access stratum) layer of an MTC user equipment scans all radio frequency channels according to a request of NAS layer of the user equipment [S801]. Having detected the accessible PLMN, the AS layer of the MTC user equipment selects a strongest signal in a mobile communication network corresponding to the detected PLMN and then receives a system information block (SIB) from a corresponding cell [S802].

Meanwhile, an eNode B broadcasts a PLMN list and a prohibition indicator using at least one system information block transmitted on a BCCH. In this case, the eNode B may be able to broadcast a single prohibition indicator for each of PLMNs included in the PLMN list. In particular, the PLMN and the prohibition indicator are mapped by one to one and the single prohibition indicator may be able to inform whether an access to a mobile communication network corresponding to each of the PLMNs is prohibited. Or, the eNode B may be able to broadcast a single prohibition indicator only for all PLMNs included in the PLMN list. In this case, the prohibition indicator informs whether an access to the mobile communication network corresponding to all PLMNs is prohibited.

The AS layer of the user equipment, specifically, the RRC layer obtains the PLMN list and the prohibition indicator from the received system information block [S803]. If the radio communication system corresponds to LTE system, the PLMN list and the prohibition indicator can be obtained via the system information block type 1.

And then, the AS layer of the user equipment, i.e., the RRC layer delivers the obtained PLMN list and the prohibition indicator to the NAS layer of the user equipment [S804]. In this case, the RRC layer of the user equipment may deliver the rest of prohibition indicators except the prohibition indicator for HPLMN (Home PLMN) to the NAS layer of the user equipment or may deliver all prohibition indicators including the prohibition indicator for the HPLMN (Home PLMN) to the NAS layer of the user equipment.

Meanwhile, the NAS layer of the user equipment checks whether the prohibition indicator reported by the AS layer of the user equipment, i.e., RRC layer indicates an access prohibition for the HPLMN [S805]. If the prohibition indicator indicates the access prohibition for the HPLMN, the NAS layer of the user equipment may be able to disregard the prohibition indicator for the HPLMN [S806]. In particular, the user equipment does not exclude a selection for the HPLMN in the process of PLMN selection since then.

As a final step, the NAS layer of the user equipment performs a PLMN selection process based on the content to which the AS layer of the user equipment reported [S807]. In this case, the NAS layer of the user equipment excludes a selection of a PLMN, which is prohibited by the prohibition indicator, for a pre-set time (T) and performs a PLMN selection process in order not to select the excluded PLMN. In this case, the T may correspond to several minutes or several hours in general and may be a fixed value to all user equipments. Or, a network may deliver the T as a UE-specific value to corresponding user equipment. Thereafter, the user equipment selects a cell after selecting a PLMN via the PLMN selection process.

Meanwhile, having selected the PLMN, the user equipment performs a cell selection and a cell re-selection process. The user equipment detects a suitable cell and may be then able to camp on the detected cell. The cell on which the user equipment camped may be able to broadcast a prohibition indicator for the PLMN that the user equipment selected. In this case, if the user equipment corresponds to an MTC device, the user equipment may be able to re-select a PLMN according to the process shown in FIG. 9.

Figure 9:
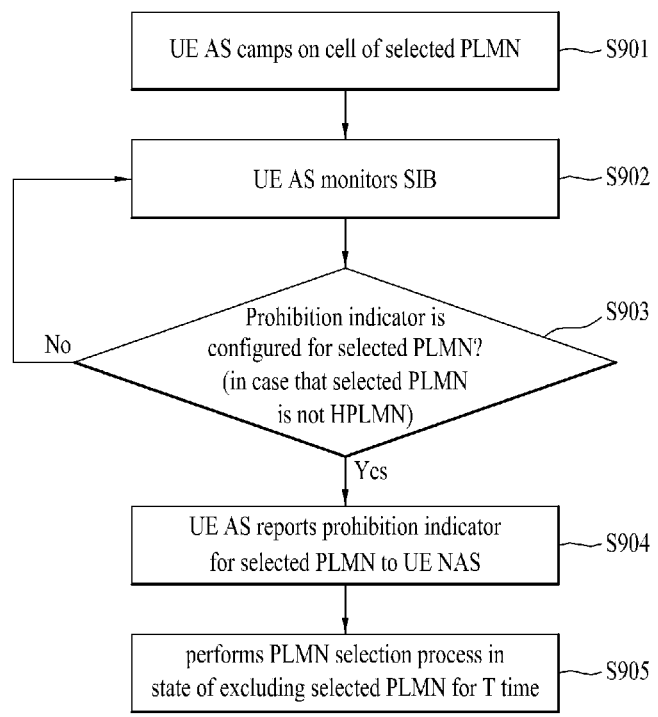
FIG. 9 is a flowchart for describing a method of re-selecting a PLMN of an MTC user equipment according to embodiment of the present invention.

FIG. 9 is a flowchart for describing a method of re-selecting a PLMN of an MTC user equipment according to embodiment of the present invention.

Referring to FIG. 9, first of all, the AS layer of the user equipment camps on the detected cell in the selected PLMN [S901]. And then, the AS layer of the user equipment monitors a system information block via BCCH of the cell on which the user equipment camped [S902].

Meanwhile, in order for an eNode B to protect a network from roaming MTC devices, the eNode B may be able to broadcast a prohibition indicator in a manner of configuring the prohibition indicator for a specific PLMN included in the PLMN list of the system information block. Or, the eNode B may be able to broadcast a prohibition indicator in a manner of configuring the prohibition indicator for all PLMNs included in the PLMN list. In particular, the eNode B may be able to inform the user equipment of addition or change of the prohibition indicator via a paging channel or a system information block type 1.

The AS layer of the user equipment, more specifically, the RRC layer of the user equipment receives the system information block and checks whether the prohibition indicator prohibits an access of the PLMN, which is selected and registered by the user equipment [S903].

If the received prohibition indicator indicates the PLMN by which the user equipment selected and registered, the AS layer of the user equipment, i.e., the RRC layer of the user equipment informs the NAS layer of the user equipment that an access of the selected and registered PLMN is prohibited by the prohibition indicator [S904]. In this case, the RRC layer of the user equipment reports an identifier (ID) of the corresponding PLMN and the corresponding prohibition indicator to the NAS layer of the user equipment.

As a final step, the NAS layer of the user equipment may be able to re-selects a PLMN according to the report [S905]. In this case, the NAS layer of the user equipment excludes a selection of PLMN, which corresponds to the prohibition indicator, for a pre-set time (T). In this case, the T may correspond to several minutes or several hours in general and may be a fixed value to all user equipments. Or, a network may deliver the T as a UE-specific value to corresponding user equipment.

The user equipment selects a cell after re-selecting a PLMN via a PLMN re-selection process. After accessing the selected cell, the user equipment may be able to perform the step 901 again. In case that the user equipment selects a PLMN, which is different from the previously selected PLMN, and selects a cell identical to the previously selected cell, if an access of the newly selected PLMN is not prohibited, the user equipment may be able to access the cell identical to the previously selected cell even for the pre-set time (T). If the PLMN prohibited by the prohibition indicator corresponds to a HPLMN, the user equipment does not exclude a selection for the HPLMN in the PLMN selection process.

As mentioned in the foregoing description, according to the present invention, a user equipment receives an access limitation information, i.e., a prohibition indicator for a single or a plurality of PLMNs from a system information block. If the access limitation information indicates an access limitation for the single or a plurality of the PLMNs, the user equipment performs the access limitation to a radio network for a specific time, thereby solving the problem of the legacy technology.

Figure 10:
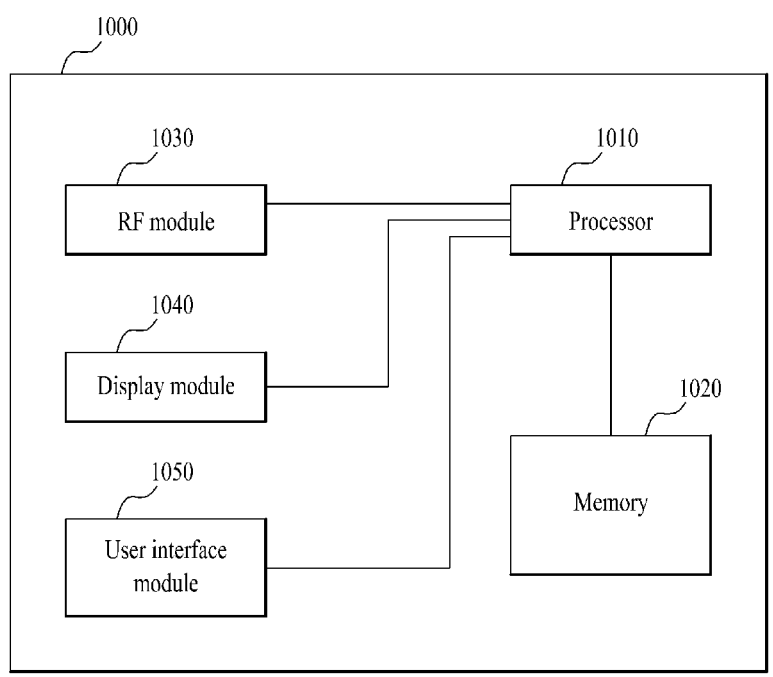
FIG. 10 is a block diagram for a configuration of a communication device according to embodiment of the present invention.

FIG. 10 is a block diagram for a configuration of a communication device according to embodiment of the present invention.

Referring to FIG. 10, a communication device 1000 may include a processor 1010, a memory 1020, an RF module 1030, a display module 1040, and a user interface module 1050.

Since the communication device 1000 is depicted for clarity of description, prescribed module(s) may be omitted in part. The communication device 1000 may further include necessary module(s). And, a prescribed module of the communication device 1000 may be divided into subdivided modules. A processor 1010 is configured to perform an operation according to the embodiments of the present invention illustrated with reference to drawings. In particular, the detailed operation of the processor 1010 may refer to the former contents described with reference to FIG. 1 to FIG. 9.

The memory 1020 is connected with the processor 1010 and stores an operating system, applications, program codes, data, and the like. The RF module 1030 is connected with the processor 1010 and then performs a function of converting a baseband signal to a radio signal or a function of converting a radio signal to a baseband signal. To this end, the RF module 1030 performs an analog conversion, amplification, a filtering, and a frequency up conversion, or performs processes inverse to the former processes. The display module 1040 is connected with the processor 1010 and displays various kinds of informations. And, the display unit 1040 can be implemented using such a well-known component as an LCD (liquid crystal display), an LED (light emitting diode), an OLED (organic light emitting diode) display and the like, by which the present invention may be non-limited. The user interface module 1050 is connected with the processor 1010 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this specification, embodiments of the present invention are described centering on the data transmission/reception relations between a user equipment and an eNode B. In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Industrial Applicability

Although a method of selecting a PLMN, which is selected by a latency tolerance access supportive of user equipment in a wireless communication system and apparatus therefor are described with reference to examples applied to 3GPP LTE system, it may be applicable to various kinds of wireless communication systems as well as to the 3GPP LTE system.

What is claimed is:

1. A method of selecting a public land mobile network (PLMN), by a user equipment (UE) having a first layer and a second layer, the method comprising:

receiving, by the first layer of the UE, a PLMN list including a plurality of PLMNs and a plurality of prohibition indicators corresponding to respective ones of the plurality of PLMNs, wherein each prohibition indicator indicates whether access to a mobile communication network corresponding to a respective PLMN is prohibited;

delivering, by the first layer of the UE to the second layer of the UE, the PLMN list and the prohibition indicators; and performing, at the second layer of the UE, a PLMN selection process that excludes any respective PLMN associated with a prohibition indicator indicating that access to the mobile communication network corresponding to the respective PLMN is prohibited, unless the excluded PLMN is a home PLMN (HPLMN) of the UE.

2. The method of claim 1, wherein the first layer of the UE is a radio resource control (RRC) layer.

3. The method of claim 2, wherein the second layer of the UE is a non-access stratum (NAS) layer.

4. The method of claim 1, wherein the PLMN selection process comprises a PLMN re-selection process.

5. The method of claim 1, wherein the excluded PLMN is prohibited from accessing the mobile communication network for a pre-set time.

6. The method of claim 5, wherein the pre-set time comprises a fixed value or a value transmitted from a network.

7. The method of claim 1, wherein the first layer of the UE receives prohibition indicator addition or change information via a paging channel or a system information block type 1.

8. A user equipment (UE), comprising:

a first layer; and a second layer, wherein the first layer is configured to receive a public land mobile network (PLMN) list including a plurality of PLMNs and a plurality of prohibition indicators corresponding to respective ones of the plurality of PLMNs, wherein each prohibition indicator indicates whether access to a mobile communication network corresponding to a respective PLMN is prohibited, wherein the first layer of the UE delivers to the second layer of the UE the PLMN list and the prohibition indicators, and wherein the second layer of the UE performs a PLMN selection process that excludes any respective PLMN associated with a prohibition indicator indicating that access to the mobile communication network corresponding to the respective PLMN is prohibited, unless the excluded PLMN is a home PLMN (HPLMN) of the UE.

9. The UE of claim 8, wherein the first layer of the UE is a radio resource control (RRC) layer.

10. The UE of claim 9, wherein the second layer of the UE is a non-access stratum (NAS) layer.

11. The UE of claim 8, wherein the PLMN selection process comprises a PLMN re-selection process.

12. The UE of claim 8, wherein the excluded PLMN is prohibited from accessing the mobile communication network for a pre-set time.

13. The UE of claim 12, wherein the pre-set time comprises a fixed value or a value transmitted from a network.

14. The UE of claim 8, wherein the first layer of the UE receives prohibition indicator addition or change information via a paging channel or a system information block type 1.

* * * * *